Patented Dec. 13, 1938

2,140,272

UNITED STATES PATENT OFFICE 2,140,272

METHOD OF PREPARING UREA DERIVATIVES

Winfield Scott, Akron, Ohio, assignor to Wingfoot Corporation, Wilmington, Del., a corporation of Delaware No Drawing. Application July 15, 1937, Serial No. 153,815

8 Claims. (Cl. 260—306)

This invention relates to a process of preparing derivatives of urea and similar compounds. More particularly it relates to a process of reacting a mercaptoarylthiazole or selenium analogue, formaldehyde, and a compound having the formula $$NH_2-\overset{X}{\underset{\|}{C}}-NH_2$$

in which X is oxygen, sulfur, or selenium.

Compounds derived from the interaction of mercaptoarylthiazoles, formadehyde, and urea find useful application as accelerators of vulcanization. However, if these compounds are prepared by the simple reaction of the starting materials, the process is a long and tedious one and is very unsatisfactory from the economic standpoint. By the present invention, it has been discovered that the time of reaction can be greatly shortened and excellent yields can be obtained by conducting the reaction in the presence of an acidic catalyst. To demonstrate the effect of an acidic catalyst is speeding up this reaction, a series of experiments was made in which varying amounts of acid were added to equal quantities of reaction materials. Thus, 33.4 grams of 2-mercaptobenzothiazole, 6 grams of urea (dissolved in 12 cc. water), and 17 grams of 36% formaldehyde were added to 150 cc. of ethyl alcohol with varying quantities of hydrochloric acid, and refluxed. The following tabulation shows the results obtained.

Table 1

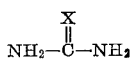

| Cubic centimeters of conc. HCo | Grams of precipitate in one hour | Grams of precipitate in three hours |
|---|---|---|
| 0 | 0 | 0 |
| 5 | 13.4 | 20.5 |
| 10 | 21.5 | 27.1 |
| 15 | 26.8 | 30.3 |

These results demonstrate the marked increase in speed of reaction obtained by adding hydrochloric acid as a catalyst, and indicate the relative effectiveness of increasing amounts of acid.

Still higher amounts of acid may be used but it is obvious that there will be a practical limitation, in that successive increments of acid will have a lessened beneficial effect. The following example will, however, illustrate the use of still higher amounts of hydrochloric acid.

Example 1

Thirty-three and four-tenths grams of 2-mercaptobenzothiazole and 10 grams of urea were added to a mixture of 200 cc. of ethyl alcohol and 50 cc. of concentrated hydrochloric acid and stirred at room temperature until uniform. To this mixture, 23 grams of 36% formaldehyde were added over a period of 15 minutes and the mix was heated to 50° C. for two hours with stirring. The reaction product was filtered and washed with fresh alcohol and when dry weighed about 42 grams, a yield equal to that theoretically obtainable. This material melted at 234–236° C.

Example 2

In another example, the alcohol was replaced by water as the dispersing medium. Thirty-three and four-tenths grams of 2-mercaptobenzothiazole, 20 grams of 37% formaldehyde, and 6 grams of urea were mixed together with sufficient water to make a thin slurry. Twenty-five cc. of concentrated hydrochloric acid were added and a slightly exothermic reaction ensued. The mixture was then heated to 80° C. for 10 minutes. The reaction mixture was diluted with water and the solid product filtered out and washed. Forty and five-tenths grams of a yellowish powder melting at 216–220° C. were obtained.

As an alternative method of procedure, the hydrochloride of urea may be formed and employed as a starting material instead of adding free hydrochloric acid as a catalyst. When this procedure is employed the reaction may, if desired, be carried out in the absence of water other than that formed during the reaction, as in the following example.

Example 3

Thirty-three and four-tenths grams of 2-mercaptobenzothiazole, 12 grams of urea hydrochloride and 6 grams of paraformaldehyde were added to 200 cc. of anhydrous methanol. After heating on a steam bath for two hours, the reaction product was separated, washed and dried. According to this procedure the product was obtained in the form of crystals in a high state of purity which melted at 250–251° C.

Other acids and acidic substances may be employed in the place of hydrochloric acid. Table 2 demonstrates the results obtained with other representative acids. The reaction mixture in each case consisted of 33.4 grams of 2-mercaptobenzothiazole, 6 grams of urea, 17 grams of 36% formaldehyde, 250 cc. of water and the amount of acid indicated in the table. This mixture was placed in a flask, set on a steam bath, and heated with agitation for one hour. The product was filtered hot and washed several times with water. After drying, a 10 gram sample was treated at room temperature with 100 cc. of 10% sodium carbonate solution to remove any unreacted mercaptobenzothiazole present. The insoluble portion represents the reaction product.

Table 2

| Acid | Amount used | Yield in grams | Percent insoluble in 10% Na₂CO₃ |
| --- | --- | --- | --- |
| None | | 32.3 | None |
| Benzene sulfonic | 6.0 g. | 39.6 | 89 |
| Trichloracetic | 5.0 g. | 39.9 | 63 |
| Oxalic | 10.0 g. | 40.1 | 85 |
| Hydrobromic (48%) | 7.5 cc. | 40.1 | 66 |
| Phosphoric (85%) | 5.0 g. | 38.5 | 58 |
| Sulfuric | 15.0 g. | 40.1 | 78 |

Other acids than those listed may also be employed and, in addition, acidic salts are found useful, as are also such substances as thionyl chloride, sulfuryl chloride, phosphorus chlorides or oxychlorides, etc. which hydrolyze to yield acids.

Example 4

For example, 33.4 grams of 2-mercaptobenzothiazole, 6 grams of urea, and 17 grams of 36% formaldehyde were added to 250 cc. of water. To this were added 25 grams of sodium bisulfate and the mixture was heated on a steam bath with stirring for one hour. The reaction product was separated by filtering hot and was washed several times with water. About 39.9 grams of product were obtained. While any suitable acidic substance may be used, the acids themselves are preferred and, of these, hydrochloric acid is most preferred. It is also generally preferred that non-oxidizing acids or acidic substances be used, since oxidizing agents will tend to promote the formation of dithiazyl disulfides.

Various modifications in the above method of reaction may be made without departing from the scope of the invention as contemplated. If desired, the reaction may be carried out stepwise by forming intermediate derivatives, as by reacting 2-mercaptobenzothiazole with formaldehyde to form benzothiazyl thio methylene hydrin and then reacting this compound with urea, or by reaction of the urea and 2-mercaptobenzothiazole and treating this product with formaldehyde, or by first interacting the urea and formaldehyde to form methylol urea and reacting this compound with the 2-mercaptobenzothiazole. If desired a mixture of acids and/or salts of urea may be employed. For example urea hydrochloride may be used together with a different acid such as sulfuric acid.

While 2-mercaptobenzothiazole has been employed in the foregoing examples and description, this compound may be replaced by any other mercaptoaryl thiazole such as 2-mercapto 6-nitrobenzothiazole, 2-mercapto 6-chlorbenzothiazole, 2-mercapto 4-phenylbenzothiazole, 2-mercapto 4-methylbenzothiazole, 2-mercapto 6-ethoxy benzothiazole, 2-mercapto 6-methoxybenzothiazole, 2-mercapto 6-chlor 5-nitrobenzothiazole, 2-mercapto 6-hydroxybenzothiazole, the mercaptonaphthothiazoles, etc. Also corresponding selenium compounds may be used. These latter include the 2-mercaptoarylselenazoles, the 2-selenolarylthiazoles, and the 2-selenolarylselenazoles.

In like manner, the urea of the examples may be replaced by its sulfur or selenium analogs.

Example 5

For example, 33.4 grams of 2-mercaptobenzothiazole, 7.6 grams of thiourea, and 20 grams of 36% formaldehyde were mixed with sufficient water to form a thin slurry, and 20 cc. of concentrated hydrochloric acid were added. The mixture was warmed to 70° C. and stirred for about 10 minutes. It was then allowed to stand for 30 minutes and the stiff, crumbly product was treated with 200 cc. of water, washed, and dried. This product was a yellow solid which softened at about 93° C. and melted with decomposition at 104–105° C. About 41.5 grams were obtained.

Although the proportions of reactants employed in the cited examples are in the ratio of 2 mols of the azole to 2 mols of formaldehyde and one mol of the carbamid, it is evident that different proportions may be employed to modify the course of the reaction without substantially changing the final result.

Although only the preferred forms of the invention are described in detail it will be apparent to those skilled in the art that various modifications and changes may be made therein without departing from the spirit of the invention or the scope of the appended claims.

I claim:

1. The method of reacting a 2-mercaptoarylenethiazole, formaldehyde, and a compound having the formula

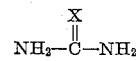

in which X is selected from the group consisting of oxygen, sulfur and selenium which comprises conducting the reaction in the presence of an acidic catalyst.

2. The method of reacting a 2-mercaptoarylenethiazole, formaldehyde, and a compound having the formula

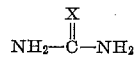

in which X is selected from the group consisting of oxygen, sulfur and selenium which comprises conducting the reaction in the presence of an acid.

3. The method of reacting a 2-mercaptoarylenethiazole, formaldehyde, and urea which comprises conducting the reaction in the presence of an acidic catalyst.

4. The method of reacting a 2-mercaptoarylenethiazole, formaldehyde, and urea which comprises conducting the reaction in the presence of hydrochloric acid.

5. The method of reacting a 2-mercaptobenzothiazole, formaldehyde and urea which comprises conducting the reaction in the presence of an acidic catalyst.

6. The method of reacting 2-mercaptobenzothiazole, formaldehyde, and urea, which comprises conducting the reaction in the presence of an acidic catalyst.

7. The method of reacting 2-mercaptobenzothiazole, formaldehyde, and urea, which comprises conducting the reaction in the presence of hydrochloric acid.

8. The method of reacting a compound having the formula

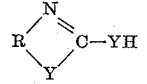

in which R is an arylene group and Y is selected from the group consisting of sulfur and selenium, with formaldehyde and a compound having the

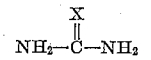

in which X is selected from the group consisting of oxygen, sulfur and selenium, which comprises conducting the reaction in the presence of an acidic catalyst.

WINFIELD SCOTT.